(12) United States Patent
Penzotti

(10) Patent No.: US 6,758,302 B2
(45) Date of Patent: Jul. 6, 2004

(54) LOW VIBRATION DRIVELINE

(75) Inventor: Roger P. Penzotti, Mount Vernon, WA (US)

(73) Assignee: Paccar Inc, Bellevue, WA (US)

( * ) Notice: Subject to any disclaimer, the term of this patent is extended or adjusted under 35 U.S.C. 154(b) by 0 days.

(21) Appl. No.: 10/397,093

(22) Filed: Mar. 24, 2003

(65) Prior Publication Data

US 2003/0183439 A1 Oct. 2, 2003

Related U.S. Application Data

(63) Continuation of application No. 09/768,743, filed on Jan. 23, 2001, now abandoned.

(51) Int. Cl.[7] .............................................. B60K 17/22
(52) U.S. Cl. ........................ 180/383; 180/379; 180/381
(53) Field of Search ............................... 180/379, 381, 180/383, 377, 380; 280/5.515, 5.512, 124.106, 5.5; 464/170, 179, 180, 182

(56) References Cited

U.S. PATENT DOCUMENTS

| 1,607,919 A | | 11/1926 | Saives | |
|---|---|---|---|---|
| 1,949,830 A | | 3/1934 | Fageol | |
| 2,295,213 A | | 9/1942 | Holmstrom | |
| 2,607,431 A | | 8/1952 | Buckendale | |
| 2,870,854 A | | 1/1959 | Keese | |
| 3,089,559 A | * | 5/1963 | Rieck | 180/292 |
| 3,157,238 A | | 11/1964 | Kraemer et al. | |
| 3,324,965 A | | 6/1967 | Koch | |
| 3,593,541 A | * | 7/1971 | Kuroda | 464/116 |
| 3,871,466 A | * | 3/1975 | Bessiere | 180/370 |
| 4,118,951 A | * | 10/1978 | Neasham | 464/178 |
| 4,395,246 A | * | 7/1983 | Taig et al. | 464/153 |
| 4,540,383 A | * | 9/1985 | Taig | 464/110 |
| 4,766,969 A | * | 8/1988 | Mishio et al. | 180/381 |
| 4,771,842 A | * | 9/1988 | Mishio et al. | 180/376 |
| 4,826,189 A | | 5/1989 | Jacobs | |
| 5,195,930 A | * | 3/1993 | Hirano et al. | 464/180 |
| 5,203,740 A | * | 4/1993 | Okuzumi et al. | 464/89 |
| 5,469,931 A | * | 11/1995 | Kawata et al. | 180/379 |
| 5,525,110 A | * | 6/1996 | Riccitelli et al. | 464/118 |
| 5,615,906 A | * | 4/1997 | Raidel, Sr. | 280/686 |
| 5,645,487 A | | 7/1997 | Lloyd et al. | |
| 5,868,517 A | * | 2/1999 | Aoki et al. | 403/359.1 |
| 5,904,622 A | * | 5/1999 | Breese et al. | 464/180 |
| 5,980,389 A | * | 11/1999 | Nienhaus | 464/172 |
| 6,085,853 A | | 7/2000 | Wernick | |
| 6,345,680 B1 | * | 2/2002 | Hill | 180/376 |
| 6,345,826 B1 | * | 2/2002 | Kurzeja et al. | 280/5.5 |
| 6,578,657 B2 | * | 6/2003 | Baxter, Jr. | 180/376 |

FOREIGN PATENT DOCUMENTS

| DE | 3630348 | * | 3/1987 |
|---|---|---|---|
| JP | 02128924 | * | 5/1990 |
| JP | 03139436 | * | 6/1991 |

* cited by examiner

*Primary Examiner*—Paul N. Dickson
*Assistant Examiner*—Deanna Draper
(74) *Attorney, Agent, or Firm*—Christensen O'Connor Johnson Kindness PLLC

(57) ABSTRACT

The present invention is directed to a driveline configuration for a heavy-duty truck having multiple drive axles. The driveline configuration reduces the torsional vibrations associated with second order torsional excitation produced by the driveline's universal joints in both nominal and off-design conditions. The forward drive axle (101) and rearward drive axle (102) are oriented such that the interaxle drive shaft (110) utilizes a parallel shaft geometry with small joint operating angles. A double cardan joint (115) connects the main drive shaft (107) to the forward drive axle.

23 Claims, 9 Drawing Sheets

*Fig. 6.* *(PRIOR ART)*
MODIFIED TO SHOW JOINT OPERATING ANGLES

LOW VIBRATION DRIVELINE

CROSS-REFERENCE TO RELATED APPLICATION

This application is a continuation of U.S. application Ser. No. 09/768,743, filed Jan. 23, 2001, now abandoned, priority from the filing date of which is hereby claimed under 35 U.S.C. §120.

FIELD OF THE INVENTION

Drivelines for vehicles having at least two drive axles and, more particularly, to configurations of such drivelines exhibiting torsional vibrations.

BACKGROUND OF THE INVENTION

The large trucks that are used to transport freight on our nation's highways—including, for example, Class 8 trucks—are most commonly tractor-semitrailer combinations having a tractor configured with a steerable axle at the front and tandem driving axles at the rear. Typically, these trucks utilize a "conventional" power train arrangement, depicted schematically in FIGS. 1 and 2. In this conventional power train arrangement, power produced by the engine (not shown) is transmitted through the transmission 108 to the forward drive axle 101 through a main drive shaft 107. Although a single drive shaft is shown, it is common, and contemplated by the present invention, that a compound main drive shaft structure (i.e., two or more drive shafts rotatably connected with universal joint(s)) may be used.

In this prior art driveline, the forward end 107A of the main drive shaft 107 connects to the output shaft of the transmission 108 with a first universal joint 109A. As used herein, "output shaft" refers to a shaft, typically but not necessarily a pinion shaft, on a component such as a transmission or an axle, that is driven by or through the component to provide power to another downstream component, and an "input shaft" refers to a shaft, again typically but not necessarily a pinion shaft, on a component such as an axle, which is externally driven to provide power to and/or through the component.

The rearward end 107B of the main drive shaft 107 connects to the input shaft 128 of the forward drive axle 101 with a second universal joint 109B (FIG. 2). A similar but generally shorter interaxle drive shaft 110 transmits power between the forward drive axle 101 and the rearward drive axle 102. The forward end 110A of the interaxle drive shaft 110 connects to the output shaft 130 of the forward drive axle 101 with a third universal joint 109C, and the rearward end 110B of the interaxle drive shaft 110 connects to the input shaft 132 of the rearward drive axle 102 with a fourth universal joint 109D.

The universal joints 109 allow the interconnected shafts to rotate about their respective axes, notwithstanding nonalignment between the shafts. Various types of universal joints are commonly used in automotive drivelines, but the most prevalent by far, particularly in heavy-duty applications, is the so-called cardan joint (also known as a Hooke joint). Cardan joints have the advantages of mechanical simplicity, good reliability, and low cost. A disadvantage of the cardan joints, however, is that uniform rotational motion at the input yoke of the joint results in non-uniform motion at the output yoke of the joint unless the joint operating angle is zero, that is, unless the shafts connected by the cardan joint rotate about a common axis. (The joint operating angle is defined herein to be the absolute value of the acute angle defined by the axes of the two shafts connected through the universal joint.)

The relationship between the input motion and the output motion across a simple cardan joint is well known. For small joint operating angles, a constant rotational velocity at the input yoke of the joint will produce nonconstant rotational motion at the output yoke having a maximum angular (or torsional) acceleration that increases approximately in proportion to the square of the shaft rotational speed and approximately in proportion to the square of the joint operating angle. In typical vehicle power trains, the drive shafts typically rotate at several thousand revolutions per minute. Therefore, even small joint operating angles can produce large angular accelerations. The angular accelerations are periodic, with a frequency of twice the shaft speed.

Large torsional accelerations can produce high dynamic torques on the universal joints and other driveline components. These dynamic forces can be very damaging to the internal components of the transmission, as well as the axle gearing and the universal joints themselves. Moreover, the dynamic forces are periodic, and can occur at resonant frequencies of the driveline, thereby amplifying the stresses and strains induced in the driveline. Consequently, designers strive to achieve driveline geometries with small joint operating angles that limit the torsional accelerations to levels that are consistent with long component life.

In drivelines having appropriately-phased, multiple cardan joints, non-uniform motion produced by one joint may be at least partially offset by one or more of the remaining joints. Referring now to FIGS. 3A and 3B, in a drive shaft 143 interconnecting an input shaft 141 with an output shaft 145, using a pair of cardan joints 109A, 109B, there are two configurations whereby the angular accelerations introduced at the input joint 109A will be ideally compensated for at the output cardan joint 109B. In the first ideal configuration, shown in FIG. 3A, the input shaft 141 is parallel to the output shafts 145 ("parallel shaft geometry"), so the joint operating angles (angles A and B) are equal. In the second ideal configuration, shown in FIG. 3B, the input shaft 141 is not parallel to the output shaft 145, but the shafts are configured so that the joint operating angles are again equal ("intersecting shaft geometry"). If the joint angles A and B are equal and the joints are phased appropriately, uniform rotary motion of the input shaft 141 will produce uniform rotary motion at the output shaft 145 with either the parallel shaft or the intersecting shaft geometries. However, the drive shaft 143 located between the universal joints 109A, 109B will still exhibit non-uniform motion and angular accelerations, and the inertia of the drive shaft 143 will generate second order (twice shaft speed) dynamic torsional loads on the joint assemblies 109A, 109B. If the two joint angles A and B are not equal, then uniform rotation of the input shaft 141 will produce non-uniform rotation of output shaft 145. The difference between the joint operating angles of the two joints (i.e., A minus B) is known as the "cancellation error."

In order to avoid the angular vibrations introduced by cardan joints, so-called constant velocity (CV) joints have been developed. Several different types of CV joints have been developed, including, for example, ball-and-groove type joints such as Rzeppa, Weiss joints, helical or skewed groove joints, tracta joints, cross-groove joints, double-offset joints, tripot joints and flexing type joints. CV joints introduce little or no rotational non-uniformity. CV joints are commonly used in particular applications, notably on the axle shafts of front wheel drive automobiles. The primary disadvantages of CV joints are that they are complex and expensive compared to cardan joints, and they tend to have lower mechanical efficiency and poorer reliability than cardan joints. Consequently, CV joints are typically used only where acceptable performance cannot be achieved with cardan joints.

A near-constant-velocity joint can be achieved through the use of a "double cardan joint" or a "centered double cardan joint," as shown in FIG. 4. Conceptually, a centered double cardan joint 50 is made by combining two conventional cardan joints into a single joint by merging the two inner yokes into a single, two-sided "coupling yoke" 53. A centering bearing 57 is incorporated into the joint that constrains the operating angles of the two joint halves to remain nearly equal. While not a true constant velocity joint, the departure from ideal behavior is small until the operating angle becomes quite large.

In drive trains configured as depicted in FIG. 2, the transmission 108 is usually installed such that the axis of the transmission output shaft 126 is directed generally toward the input shaft 128 of the forward drive axle 101, such that the two universal joints 109 at either end of the drive shaft 107 operate at equivalent and small, but non-zero, joint operating angles. A joint operating angle of zero is generally avoided to ensure that the joint bearings (not shown) rotate as the drive shaft revolves in order to distribute lubrication within the bearing and avoid premature wear or "brinelling" of the bearing elements.

Driveline engineers strive to achieve drive shaft geometries that provide small joint operating angles and minimal cancellation error so that second-order torsional accelerations are minimized throughout the driveline. On trucks with tandem drive axles, this has been difficult to accomplish because the two drive axles 101, 102, are closely spaced. Typically, the output shaft 130 on the forward drive axle 101 and the input shaft 132 on the rear drive axle 102 are vertically offset due to the presence of a power-dividing differential in the forward drive axle 101. Additionally, the drive axles 101, 102, are generally provided with a suspension system 111 that permits the axles to move vertically relative to each other, and relative to the vehicle chassis during operation of the vehicle. Because the drive axles 101, 102, are closely spaced, the joint operating angles on the interaxle shaft 110 are very sensitive to relative vertical motion between the drive axles 101, 102, caused by motion of the suspension 111.

FIG. 1 shows a trailing arm air suspension 111, of the type commonly used in modern commercial trucks, wherein the forward and rearward drive axles 101 and 102 are clamped rigidly to the trailing arm springs 103 (also called main support members). The forward end of the trailing arm springs 103 is connected with pivots 106 to frame brackets 104, which mount to frame structure 114 shown in phantom view. Air springs 105 act on the rear part of the trailing arm springs 103 and carry a portion of the sprung load. The remaining share of the sprung load is carried on the forward portion of the trailing arm springs 103. The trailing arm springs 103 have very high flexural stiffness compared to the air springs and, under normal vertical deflections of the suspensions 111, the axles 101, 102 articulate approximately about the trailing arm pivots 106.

A parallel shaft geometry driveline configuration is shown in FIG. 5, with the trailing arm springs 103 shown in phantom. Here, both the transmission 108 and the forward drive axle 101 are inclined at an angle that provides the desired small operating angles on the drive shaft universal joints 109A and 109B. The rearward drive axle 102 is installed in a parallel configuration with the forward drive axle 101. Due to the vertical offset between the forward drive axle output shaft 130 and the rearward drive axle input shaft 132, this configuration results in large joint operating angles on the interaxle drive shaft 110 at joints 109C and 109D, which produce high torsional accelerations in the interaxle shaft. Due to poor reliability of the interaxle shaft universal joints 109C and 109D, this configuration has been largely replaced with an intersecting shaft geometry, as shown in FIG. 6, which provides for smaller joint operating angles on the interaxle shaft joints 109C and 109D. In the intersecting shaft geometry, the rearward drive axle 102 is rotated such that the intersection of the axis of the forward drive axle output shaft 130 and the axis of the rearward drive axle input shaft 132 lies midway between the interaxle shaft joints 109C and 109D to provide approximately equal shaft joint angles.

The driveline geometry is usually established to provide optimal performance at the nominal operating position of the suspension 111 (shown in FIG. 1). However, the driveline must also accommodate the geometry changes that occur as a result of motions of the suspension 111. As the chassis moves up and down on the suspension 111, the axles 101 and 102 articulate about their respective trailing arm spring pivots 106 some distance ahead of the axle. Consequently, the pitch angle of the axles 101 and 102 relative to the chassis frame structure 114 (shown in phantom in FIG. 1) also changes. Both the vertical motion and the pitch rotation of the axles cause the driveline geometry and joint angles to change.

In a truck utilizing the parallel shaft geometry shown in FIG. 5, the joint operating angles on the interaxle shaft 110 will increase as the chassis frame 114 moves downward (with respect to the axles), compressing the suspension whereby the trailing arm springs 103 pivot about the pivots 106 (shown in phantom), and decrease as the chassis frame 114 moves upward. However, in a parallel shaft geometry, the two joint operating angles on the interaxle shaft 110 will remain approximately equal. So while the large joint operating angles create high torsional accelerations in the interaxle shaft 110, the lack of any significant cancellation error limits or mitigates the torsional accelerations from being propagated beyond the interaxle shaft 110.

In a truck utilizing the intersecting shaft geometry shown in FIG. 6, however, an entirely different result is obtained. As the suspension 111 (shown in FIG. 1) compresses, the joint operating angles at joint 109C at the forward end of the interaxle shaft 110 increases, while the joint operating angles at joint 109D at the rear of the interaxle shaft 110 decreases. Therefore, small movements of the suspension 111 rapidly generate large cancellation errors within the interaxle shaft 110. The cancellation error increases until one joint operating angle passes through zero, at which point the cancellation error is constant. The large cancellation error in the interaxle shaft joints 109C and 109D produces high amplitude second order torsional vibrations in the main drive shaft 107, which can damage internal components of the transmission 108 and other power train components.

As noted earlier, one possible solution for eliminating torsional vibrations is to use CV joints. Installing CV joints at both ends of the interaxle shaft 110 and at the forward drive axle input shaft 128 would largely eliminate second order torsional vibrations. However, the shortcomings of CV joints make this an expensive and unappealing solution. An additional limitation is that CV joints generally cannot operate at the large operating angles that occur in the interaxle drive shaft 110 during "cross-articulation"—i.e., when one of the drive axle suspensions is fully compressed and the other is fully extended, as often occurs when the vehicle traverses obstacles such as curbs at low speeds or otherwise operates in rough terrain. The extremely short length of the interaxle shaft 110 may also be insufficient for packaging two CV joints and also provide for the slip needed to accommodate the change in length under articulation. So the use of CV joints in the interaxle drive shafts where the largest cancellation errors occur is impractical. For these reasons, conventional highway tractors typically do not utilize CV-equipped interaxle shafts.

SUMMARY OF THE INVENTION

The present invention is directed to a low-vibration driveline for a vehicle having a plurality of rearwardly disposed, driven axles. In a preferred embodiment the low-vibration driveline includes a forward and a rearward drive axle interconnected with an interaxle drive shaft. The drive axles are oriented with the output shaft from the forward drive axle directed generally towards the input shaft on the rearward drive axle, such that the interaxle assembly is in a parallel shaft geometry with joint operating angles that are small. The interaxle drive shaft is connected to the drive axles with universal joints. A main drive shaft that transmits power to the drive axles is connected to the forward drive axle input shaft using a constant velocity, or near-constant velocity universal joint.

In a preferred embodiment, the joint operating angles on both ends of the interaxle drive shaft are not more than 5 degrees. In another preferred embodiment these joint operating angles are less than about 2 degrees.

In embodiments of the present invention that utilize constant velocity universal joints to connect the main drive shaft to the forward drive axle, the constant velocity joint may be of the Rzeppa, Weiss, tripot type, double-offset type, or derivative designs.

In an embodiment of the present invention that utilizes a near-constant velocity joint to connect the main drive shaft to the forward drive axle, a double-cardan type near constant velocity joint may be used.

In another aspect of the present invention, the forward end of the main drive shaft connects to a transmission with a universal joint, the universal joint having a small joint operating angle.

In an aspect of the present invention, the nonconstant velocity and non-near-constant velocity joints may be of the cardan type of universal joint.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is directed to a driveline configuration that greatly reduces driveline vibrations, and in particular reduces U-joint generated second-order torsional vibrations in the driveline. Further, the amplitude of the torsional vibrations at the transmission end of the driveline are relatively insensitive to normal operating changes in the suspension height and remain near zero for any suspension position.

Figure 7:
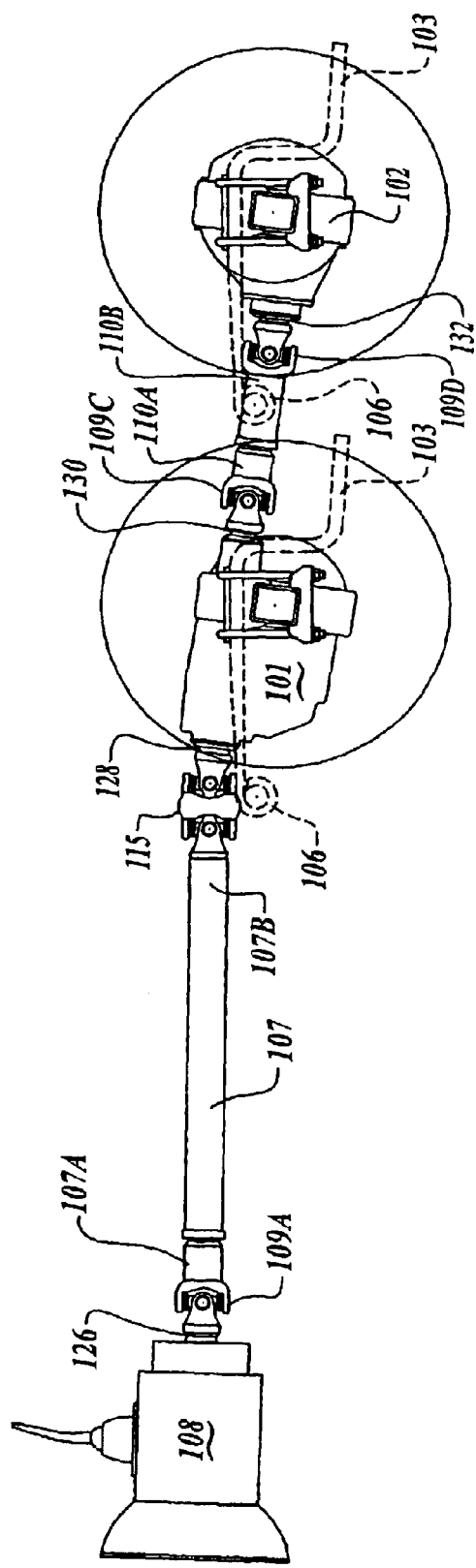
FIG. 7 is a schematic side view of a driveline according to the present invention.

In a preferred embodiment, shown in FIG. 7, the forward drive axle 101 and the rearward drive axle 102 are arranged such that the output shaft 130 of the forward drive axle 101 is parallel to, and directed approximately towards, the input shaft 132 of the rear drive axle 102. The installation angles of the drive axles 101 and 102 are selected to provide small joint operating angles on the interaxle drive shaft 110 at universal joints 109C and 109D when the vehicle is at the nominal design position. In the preferred embodiment, the joint operating angles at joints 109C and 109D are preferable between 1 degree and 5 degrees, and more preferably less than about 2 degrees.

The forward drive axle output shaft 130 is approximately parallel to the rearward drive axle input shaft 132. Therefore, the interaxle drive shaft 110 utilizes a parallel shaft geometry. Standard cardan type joints 109C, and 109D are used at each end of the interaxle drive shaft 110.

The transmission 108 is installed so that the transmission output shaft 126 is directed generally toward the forward drive axle input shaft 128, and at an angle that provides for a small but non-zero joint operating angle at the transmission output shaft 126. The joint operating angle is preferably 1 to 5 degrees, and more preferably about 1 to 2 degrees. A standard cardan joint 109A is also used at the forward end 107A of the main drive shaft 107.

At the rearward end 107B of the main drive shaft 107, a near-constant-velocity double cardan joint 115 connects the rearward end 107B of the main drive shaft 107 to the forward drive axle input shaft 128. Although the double cardan joint 115 is preferred due to its simplicity, reliability and low cost, it is also contemplated by this invention that any other suitable near-constant velocity, or true CV joint, could be used in place of the double cardan joint 115.

At the nominal design geometry shown in FIG. 7, all of the joint operating angles are small, except at the double cardan joint 115 connecting the main drive shaft 107 to the forward drive axle input shaft 128. However, since the double cardan joint is a near-constant-velocity joint, it introduces minimal cancellation error. Consequently, the torsional acceleration amplitudes at any point in the driveline will be small at the nominal design condition.

As the suspension compresses or extends from the design position whereby the trailing arm springs 103 rotate about their respective pivots 106, the joint operating angles at joints 109C and 109D on the interaxle drive shaft 110 will change. However, the magnitudes of these joint operating angles will remain smaller than what would be produced in prior art parallel shaft or intersecting shaft geometries because the initial (nominal) joint operating angles are very small. In addition, because the present invention utilizes a parallel shaft geometry for the interaxle drive shaft 110, the interaxle joint operating angles will remain approximately equal under suspension deflections. Hence, the interaxle drive shaft 110 does not introduce any significant cancellation error into the driveline, even when the suspension is deflected away from its nominal position.

Figure 8:
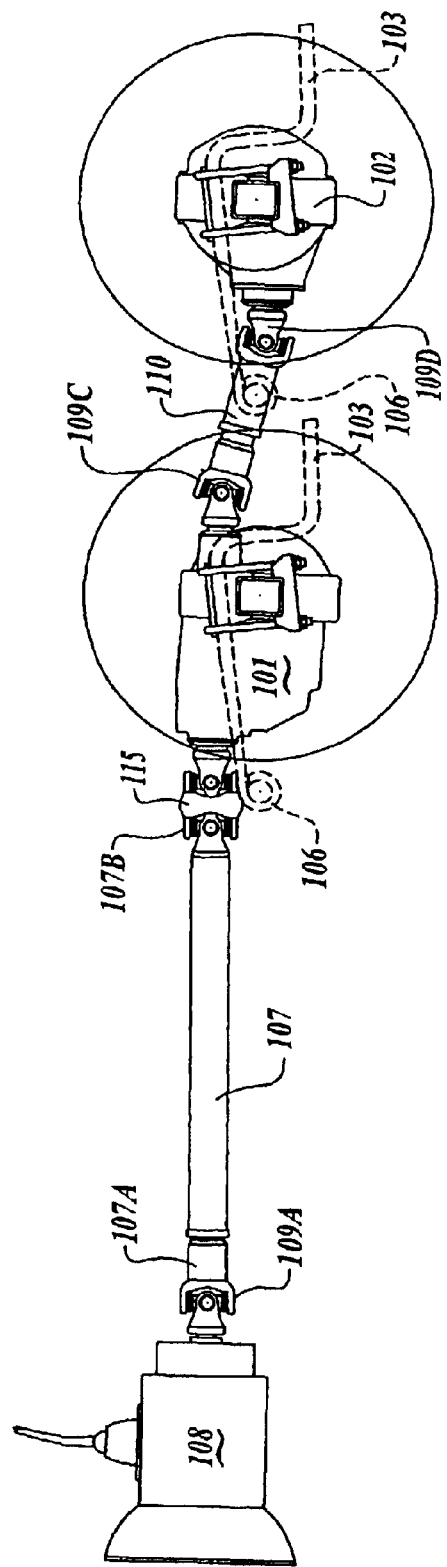
FIG. 8 is a schematic side view of the driveline illustrated in FIG. 7, but with the suspension deflected (compressed) from its nominal design position.

For example, FIG. 8 shows the driveline configuration of FIG. 7, but with the suspension deflected, i.e., the trailing arm springs 103 that support the drive axles 101, 102, have pivoted about the pivots 106. The displacement of the axles 101 and 102 about their respective trailing arm pivots 106 produces an increase in the joint operating angles on joints 109C and 109D on the interaxle drive shaft 110, and the joint operating angles remaining equal.

The flexure in the suspension will also change the joint operating angle at joint 115 between the main drive shaft 107 and the forward drive axle input shaft 128, but because a near-CV (or CV) joint is utilized, no significant cancellation error is introduced. As can be seen in FIG. 8, the flexure in the suspension causes very little or no change in the joint operating angle at the joint 109A between the transmission 108 and the drive shaft 107 because the trailing arm pivot 106 for the forward drive axle 101 is typically very close to the location of joint 115 and the main drive shaft 107 is relatively long. Changes in the position of the suspension results in only small changes in the vertical position of the double cardan joint 115 and, consequently, very small changes in the joint operating angle at the transmission cardan joint 109A.

It will be apparent to one of ordinary skill in the art that the present invention, can be implemented in a straightforward manner on vehicles having more than one driven axle, by orienting each of the driven axles such that the output shaft of each driven axle is directed towards the input shaft of the next rearward axle, and utilizing a constant velocity, or a near-constant velocity joint at the input shaft of the forwardmost drive axle. It will also be apparent that the present invention can be implemented using other types of suspensions.

Figure 1:
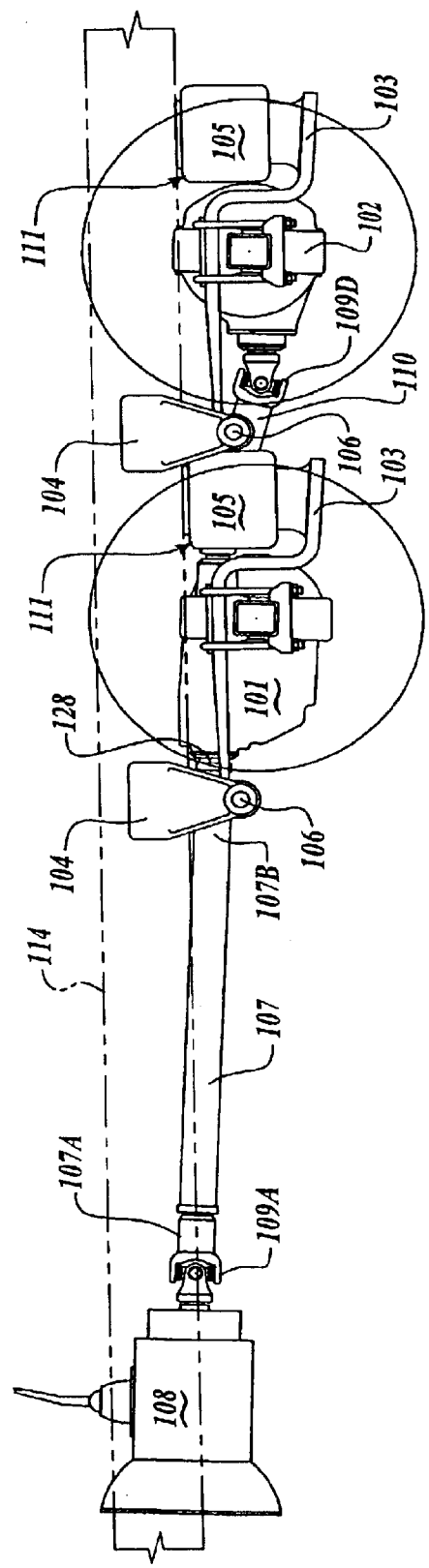
FIG. 1 is a schematic side view of a prior art driveline configuration for a truck having tandem drive axles with trailing arm air suspensions with a chassis frame member shown in phantom.
Figure 2:
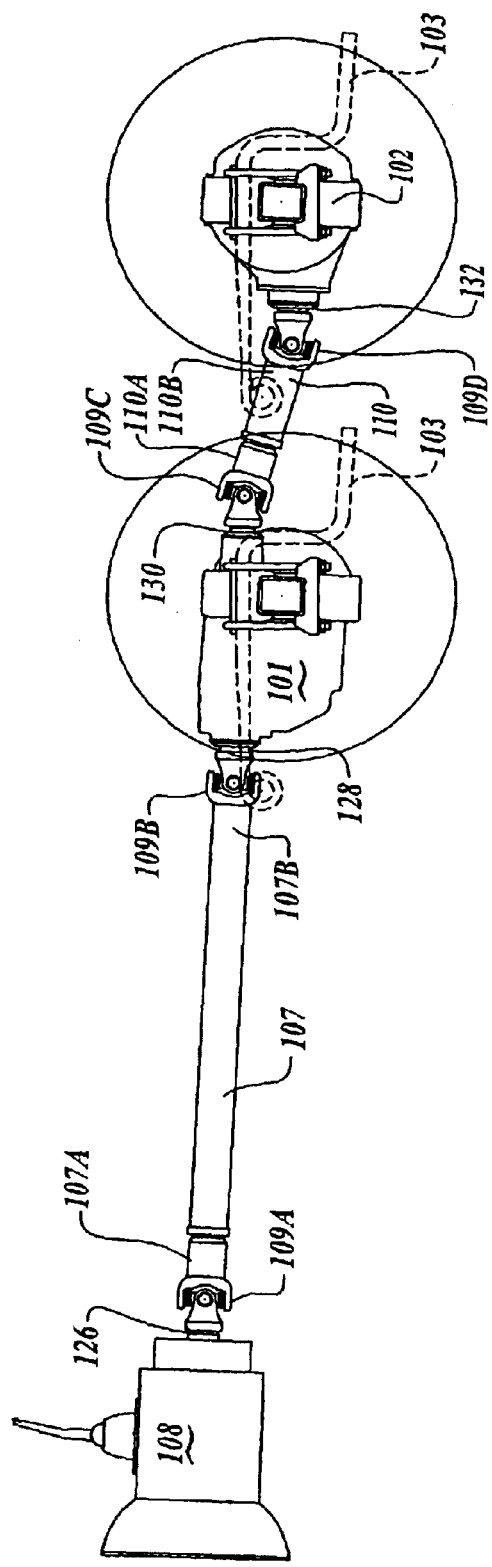
FIG. 2 is a schematic side view of the prior art driveline shown in FIG. 1 with the suspension components removed to expose the driveline components.
Figure 4:
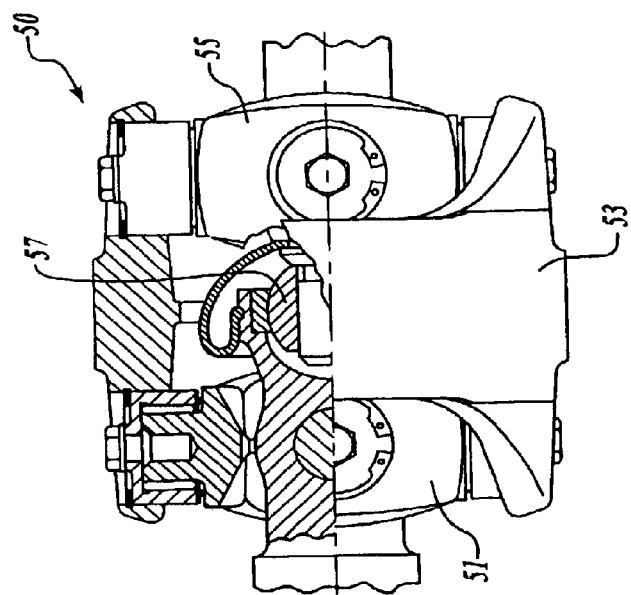
FIG. 4 is a partially cutaway view of a centered double cardan joint.
Figure 3A:
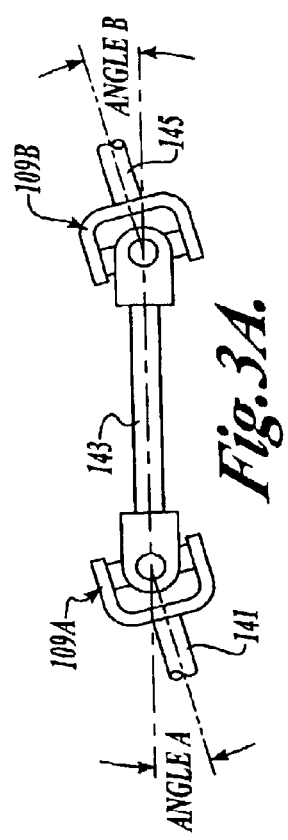
FIGS. 3A and 3B are schematic diagrams illustrating a parallel shaft geometry utilizing cardan joints and an intersecting shaft geometry utilizing cardan joints.
Figure 3B:
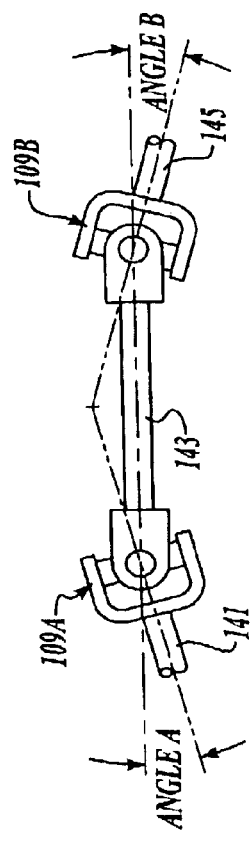
Figure 5:
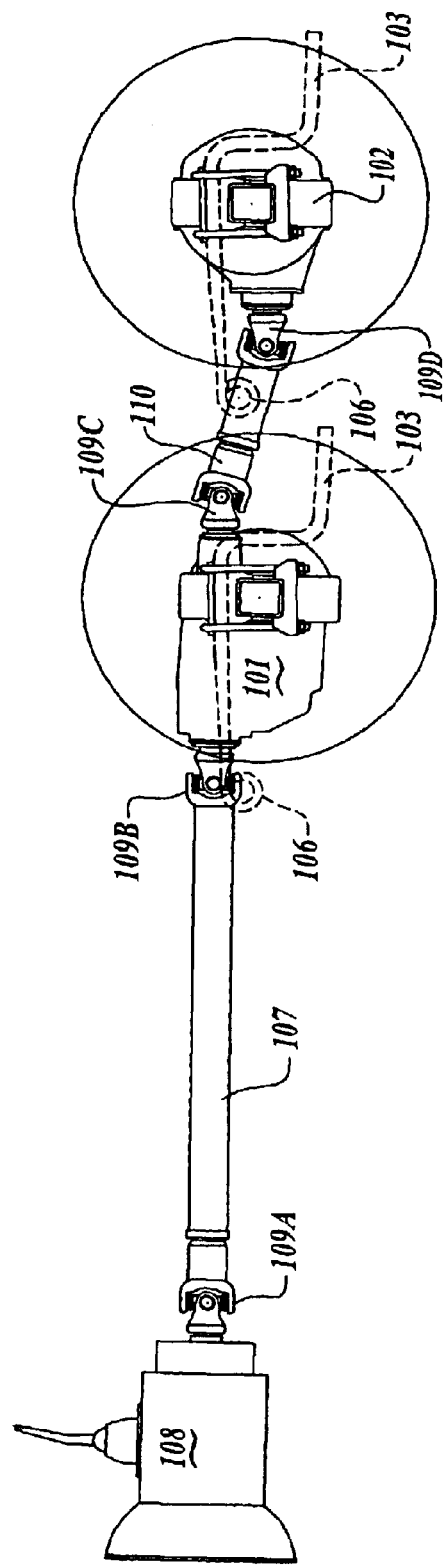
FIG. 5 is a schematic side view of a prior art driveline substantially similar to that shown in FIG. 2, and having a parallel shaft geometry interaxle drive shaft.
Figure 6:
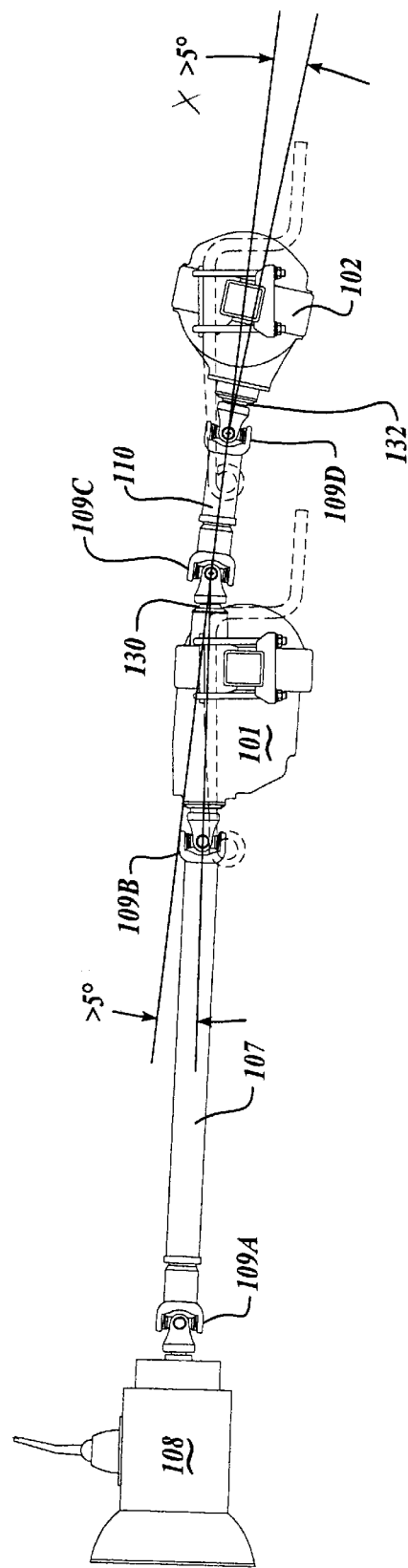
FIG. 6 is a schematic side view of a prior art driveline substantially similar to that shown in FIG. 2, but having an intersecting shaft geometry interaxle drive shaft.
Figure 9:
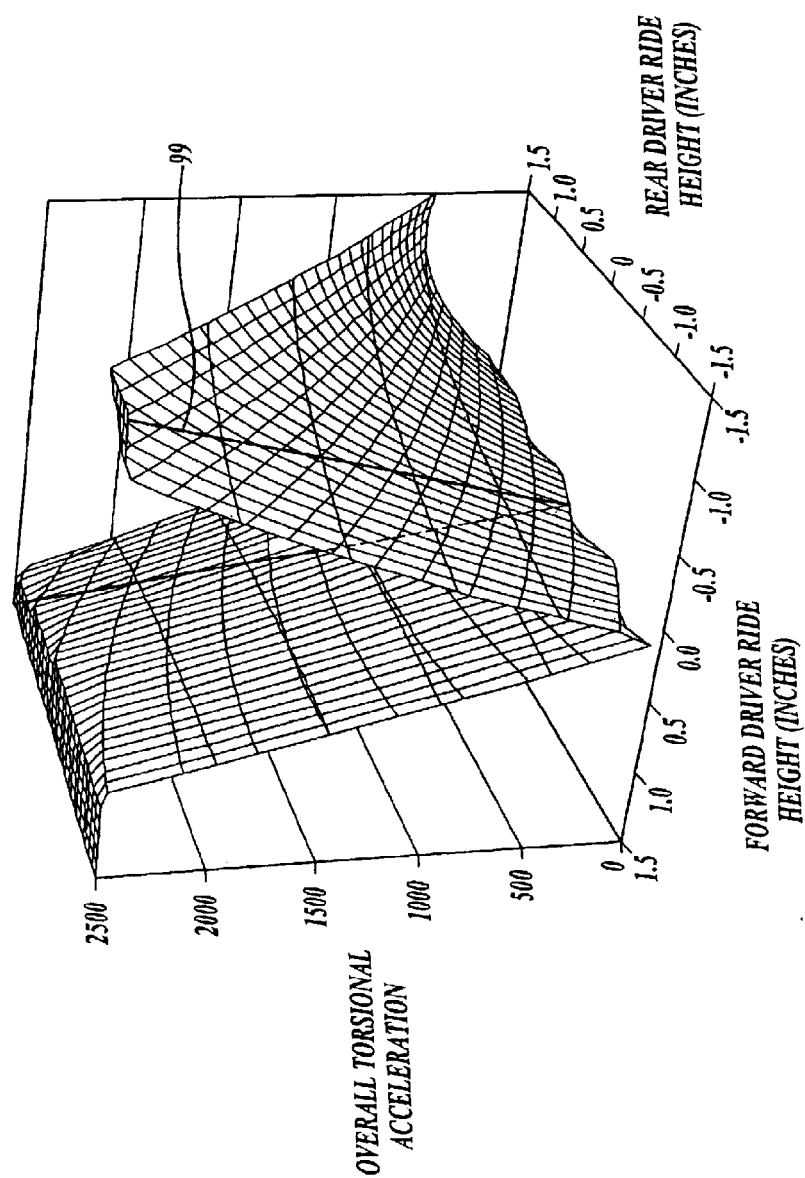
FIG. 9 shows a surface plot of the calculated torsional accelerations as a function of the forward and rear drive axle ride height (suspension deflection) for a prior art intersecting driveline such as that depicted in FIG. 2, rotating at 2,500 rpm.

A second order torsional acceleration analysis of a driveline configured according to the present invention was conducted and compared with an equivalent analysis performed for a conventional intersecting shaft geometry driveline configuration. FIG. 9 shows the calculated second order torsional accelerations for the conventional intersecting shaft geometry driveline (FIG. 5) rotating at 2,500 rpm, as a function of the forward and rearward suspension ride deflection. Significant torsional accelerations are introduced as the forward and rearward drive axle suspensions deflect through ±1.5 inches from nominal, rising rapidly from about zero at the design condition to well over 2,000 rad/sec/sec through a significant portion of the parameter space.

Figure 10:
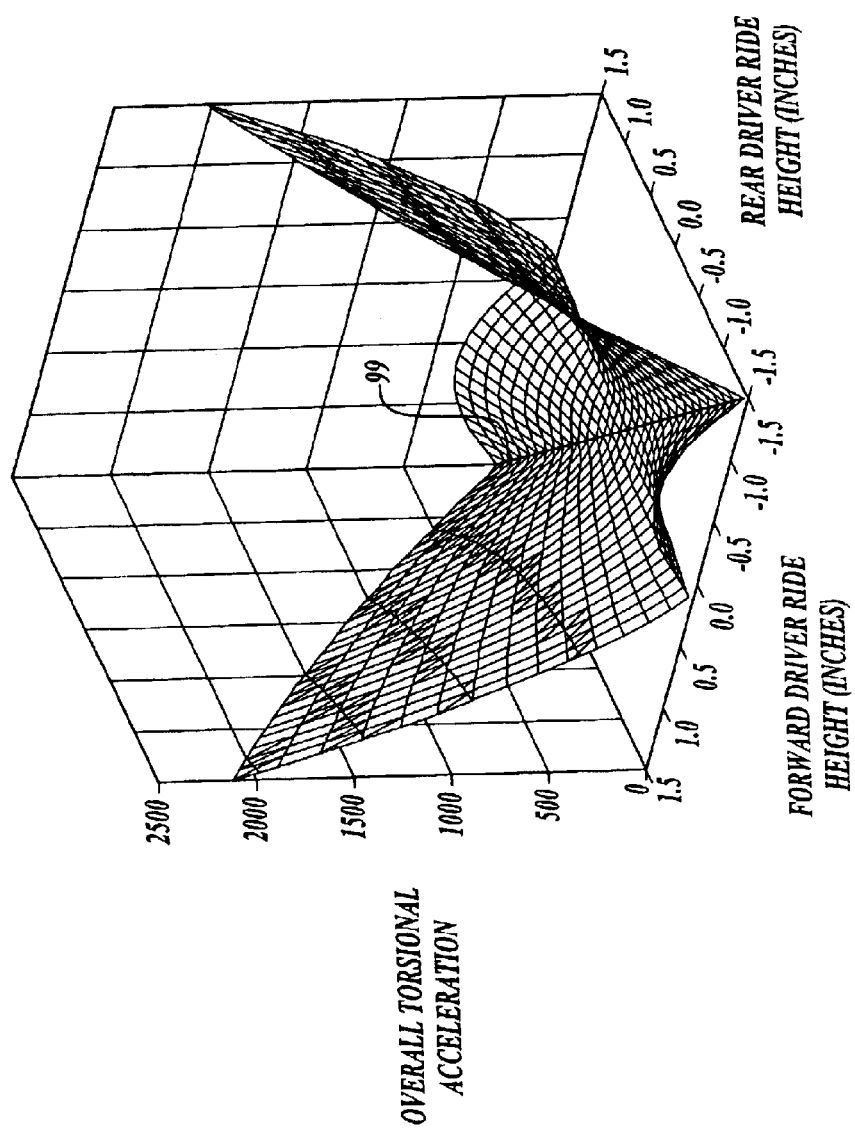
FIG. 10 shows a surface plot of the calculated torsional accelerations as a function of the forward and rear drive axle ride height (suspension deflection) for the driveline configuration according to the present invention, such as that depicted in FIG. 7, rotating at 2,500 rpm.

FIG. 10 shows the corresponding torsional accelerations calculated for a driveline configured according to the present invention (FIG. 7) under the same operating conditions. The maximum torsional accelerations are significantly lower than the prior art configuration, and in particular a large portion of the parameter space is relatively flat (less than 500 rad/sec/sec). The only portion of the parameter space wherein high torsional accelerations are found is where one suspension is significantly extended while the other suspension is simultaneously and significantly compressed. Although such counter-deflected suspension configurations can occur when a truck is traversing very irregular terrain, for example, over a curb or other obstacle in a roadway, such conditions generally occur at low speeds when the drive shafts 107 and 110 are rotating at relatively low rotational speeds. Because the torsional accelerations are proportional to the square of the shaft rotational speed, the joint-induced torsional accelerations in the driveline are generally not important at low speeds.

As discussed above, the torsional accelerations induced by the universal joints increase as the square of the rotational speeds. Therefore, the highest torsional accelerations generally occur when the vehicle is running at full speed. A common scenario involving significant suspension deflections and full shaft speeds occurs when a truck is cruising at highway speeds and dynamic factors such as accelerations or road conditions produce a vertical bounce at the rear of the truck, resulting in generally equal deflections in both suspensions. In such a scenario, the forward and rearward axle suspensions move generally in unison, and vertical displacement of the axles follow a diagonal path in FIGS. 9 and 10, shown as line 99.

Comparing FIGS. 9 and 10, it is apparent that approximately equal vertical deflections of the forward and rearward axles produce markedly different torsional accelerations in the driveline when comparing the conventional intersecting shaft geometry (FIG. 9) with the present invention (FIG. 10). The intersecting shaft geometry produces very sharply increasing torsional accelerations as the drive axles move in tandem away from the design condition in either directions. The driveline of the present invention, in contrast, produces almost no torsional accelerations as the drive axles move up and down in unison.

The driveline configuration of the present invention results in near-zero torsional acceleration amplitudes at the transmission output shaft and almost complete insensitivity to suspension ride height changes. Torsional amplitudes of the shaft between the two cardan joints on the interaxle shaft are near zero at the nominal design position and remain low over a broad range of suspension positions.

As noted earlier, frequently trucks will utilize a compound main drive shaft, having more than one drive shaft between the transmission and the forward drive axle. For example, if the chassis has a long wheel base, the distance from the transmission to the first axle may exceed the preferred maximum length for a single drive shaft. In this case, two or more shafts may be employed. Typically, the universal joint connecting a first (forward) main drive shaft with a second (rearward) main drive shaft is mounted to the chassis somewhere between the transmission and the forward drive axle. The geometry of the drive shafts is normally configured to provide small joint operating angles with proper cancellation on the forward shaft(s). The forward-most shaft(s) is attached only to the chassis and therefore its joint operating angle is not affected by suspension articulations. The rearward main drive shaft is attached to the chassis at its front end. In these embodiments, the rear-most main drive shaft is configured in a similar manner to the single main drive shaft arrangement described above—i.e., with a constant- or near-constant-velocity universal joint at its rearward end and a standard cardan joint at its forward end.

An additional benefit to the present invention is that the small joint operating angles and the parallel shaft geometry, reduce the sensitivity of the driveline to the pinion angle settings (where "pinion angles" refers to the angle that the drive axle input and output shafts make with the chassis, or a horizontal plane). As noted above, the torsional acceleration induced by the universal joint increase as the square of the joint operating angle. Therefore, in prior art driveline configurations employing relatively large joint operating angles in the interaxle drive shaft 110, truck manufacturers will typically precisely set the drive axle pinion angles after the truck is manufactured. This is an expensive and time-consuming step. In the present invention, the interaxle joint operating angles are small and the driveline is therefore much less sensitive to minor variations in pinion angle settings. The step of precisely setting the pinion angles after assembly of the truck can therefore be avoided, simplifying the manufacturing process.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A low-vibration driveline for a vehicle comprising:
    a first drive axle having an input shaft and an output shaft;
    a second drive axle having an input shaft;
    a main drive shaft having a rearward end;
    a first universal joint connecting the rearward end of the main drive shaft to the input shaft of the first drive axle, wherein the first universal joint is a constant velocity universal joint;
    an interaxle drive shaft having a forward end and a rearward end;
    a second universal joint connecting the forward end of the interaxle drive shaft to the output shaft of the first drive axle; and
    a third universal joint connecting the rearward end of the interaxle drive shaft to the input shaft of the second drive axle;
    wherein, the interaxle drive shaft forms a nominal joint operating angle of not more than 5 degrees with the output shaft of the first drive axle and not more than 5 degrees with the input shaft of the second drive axle at the nominal design position.

2. The driveline of claim 1, wherein the interaxle drive shaft forms a nominal joint operating angle of less than about 2 degrees with the output shaft of the first drive axle, and the interaxle drive shaft forms a nominal joint operating angle of less than about 2 degrees with the input shaft of the second drive axle.

3. The driveline of claim 1, wherein the second and third universal joints are cardan-type universal joints.

4. The driveline of claim 3 wherein the first universal joint is a Rzeppa-type constant velocity joint.

5. The driveline of claim 1, wherein the first drive axle output shaft, the interaxle drive shaft, and the second drive axle input shaft are disposed in a parallel shaft geometry.

6. A low-vibration driveline for a vehicle having a vehicle chassis, the driveline comprising:
    a first drive axle having an input shaft and an output shaft;
    a second drive axle having an input shaft;
    a main drive shaft having a rearward end;
    a first universal joint connecting the rearward end of the main drive shaft to the input shaft of the first drive axle, wherein the first universal joint is a near-constant velocity universal joint;
    an interaxle drive shaft having a forward end and a rearward end;
    a second universal joint connecting the forward end of the interaxle drive shaft to the output shaft of the first drive axle; and
    a third universal joint connecting the rearward end of the interaxle drive shaft to the input shaft of the second drive axle;
    wherein, the interaxle drive shaft forms a nominal joint operating angle of not more than 5 degrees with the output shaft of the first drive axle and not more than 5 degrees with the input shaft of the second drive axle.

7. The driveline of claim 6, wherein the interaxle drive shaft forms a nominal joint operating angle of less than about 2 degrees with the output shaft of the first drive axle, and the interaxle drive shaft forms a nominal joint operating angle of less than about 2 degrees with the input shaft of the second drive axle.

8. The driveline of claim 6, wherein the second and third universal joints are cardan-type universal joints.

9. The driveline of claim 6 wherein the first universal joint is a double-cardan-type near-constant velocity universal joint.

10. The driveline of claim 9 further comprising a first suspension system elastically connecting the first drive axle to the vehicle chassis and a second suspension system elastically connecting the second drive axle to the vehicle chassis, such that the first drive axle and the second drive axle can flex vertically relative to the vehicle chassis, wherein the first and second suspension systems are not actively controlled.

11. The driveline of claim 10 wherein the first and second suspension systems comprise trailing arm air suspensions.

12. The driveline of claim 6, wherein the first drive axle output shaft, the interaxle drive shaft, and the second drive axle input shaft are disposed in a parallel shaft geometry.

13. A low-vibration driveline for a vehicle comprising:
    a transmission having an output shaft;
    a first drive axle having an input shaft and an output shaft;
    a second drive axle having an input shaft;
    a main drive shaft having a forward end and a rearward end;
    a first universal joint connecting the forward end of the main drive shaft to the transmission output shaft;
    a second universal joint connecting the rearward end of the main drive shaft to the input shaft of the first drive axle;
    an interaxle drive shaft having a forward end and a rearward end;
    a third universal joint connecting the forward end of the interaxle drive shaft to the output shaft of the first drive axle; and
    a fourth universal joint connecting the rearward end of the interaxle drive shaft to the input shaft of the second drive axle;
    wherein, the interaxle drive shaft forms a joint operating angle of not more than 5 degrees with the output shaft of the first drive axle and not more than 5 degrees with the input shaft of the second drive axle; and further wherein the second universal joint is a near-constant velocity universal joint and the third and fourth universal joints are cardan universal joints.

14. The driveline of claim 13 wherein the interaxle drive shaft forms a joint operating angle of less than about 2 degrees with the output shaft of the first drive axle, and the interaxle drive shaft forms a joint operating angle of less than about 2 degrees with the input shaft of the second drive axle.

15. The driveline of claim 13 wherein the second universal joint is a double-cardan-type near-constant velocity joint.

16. The driveline of claim 15 further comprising a first suspension system elastically connecting the first drive axle to the vehicle chassis and a second suspension system elastically connecting the second drive axle to the vehicle chassis, such that the first drive axle and the second drive axle can flex vertically relative to the vehicle chassis.

17. The driveline of claim 16 wherein the first and second suspension systems comprise trailing arm air suspensions.

18. The driveline of claim 13, wherein the first drive axle output shaft, the interaxle drive shaft, and the second drive axle input shaft are disposed in a parallel shaft geometry.

19. A driveline for a truck having a transmission, a first drive axle having an input shaft and an output shaft, and a second drive axles having an input shaft; the driveline comprising:

a main drive shaft having a proximal end and a distal end;

a first cardan universal joint attached to the proximal end of the drive shaft, the first cardan universal joint adapted to connect the main drive shaft to the transmission;

an interaxle shaft having a proximal end and a distal end;

a second cardan universal joint attached to the proximal end of the interaxle shaft, the second cardan universal joint adapted to connect the interaxle shaft to the first drive axle output shaft;

a third cardan universal joint attached to the distal end of the interaxle shaft, the third cardan universal joint adapted to connect the interaxle shaft to the second drive axle input shaft; and a fourth universal joint attached to the distal end of the main drive shaft, the fourth universal joint adapted to connect the main drive shaft to the first drive axle input shaft;

wherein the joint operating angle at the second cardan universal joint and the joint operating angle at the third cardan universal joint are less than 5 degrees when the truck is in the nominal design condition; and further wherein the fourth universal joint is adapted to preclude significant torsional relative angular accelerations between the main drive shaft and the first drive axle input shaft when the main drive shaft and the first drive axle input shaft are not aligned.

20. The driveline of claim 19 wherein the interaxle drive shaft forms a joint operating angle of less than about 2 degrees with the output shaft of the first drive axle, and the interaxle drive shaft forms a joint operating angle of less than about 2 degrees with the input shaft of the second drive axle when the truck is in the nominal design condition.

21. The driveline of claim 19 wherein the non-cardan universal joint is a double-cardan universal joint.

22. The driveline of claim 19 wherein the joint operating angle at the fourth universal joint is greater than 5 degrees when the truck is in the nominal design condition.

23. The driveline of claim 19, wherein the first drive axle output shaft, the interaxle drive shaft, and the second drive axle input shaft are disposed in a parallel shaft geometry.

* * * * *